Oct. 28, 1958   J. FREI   2,857,779
CAST ROTOR WITH HOLLOW HELICAL TEETH FOR ROTARY COMPRESSORS
Filed May 3, 1954

INVENTOR:
Josef Frei

United States Patent Office 2,857,779
Patented Oct. 28, 1958

2,857,779

CAST ROTOR WITH HOLLOW HELICAL TEETH FOR ROTARY COMPRESSORS

Josef Frei, Arbon, Switzerland, assignor to Societe Anonyme Adolphe Saurer, Arbon, Switzerland, a joint-stock company of Switzerland Application May 3, 1954, Serial No. 427,318

Claims priority, application Switzerland May 16, 1953

4 Claims. (Cl. 74—466)

This invention relates to rotors for rotary compressors with hollow helical teeth. It refers more particularly to a cast rotor of this type.

The cast rotor for rotary compressors with hollow helical teeth according to the present invention is characterized thereby that it is composed of at least two elements which are arranged adjacent each other in normal planes to the axis of revolution of the rotor and that the teeth of these elements present cup-shaped cavities open towards one side, these elements being arranged adjacent each other in such manner that the rotor is closed at the outer ends by end walls.

The use of relatively short rotor elements renders it possible to cast these elements in a two-part mold which does not require any complicated core supporting means. By giving the walls of the cup-shaped cavities a suitable taper, the pattern can easily be pulled out of the sand mold by a helical movement. There is no need for fixing the end walls in place by means of pegs and screws.

In the drawing affixed to this specification and forming part thereof two embodiments of this invention are illustrated diagrammatically by way of example.

Figure 1:
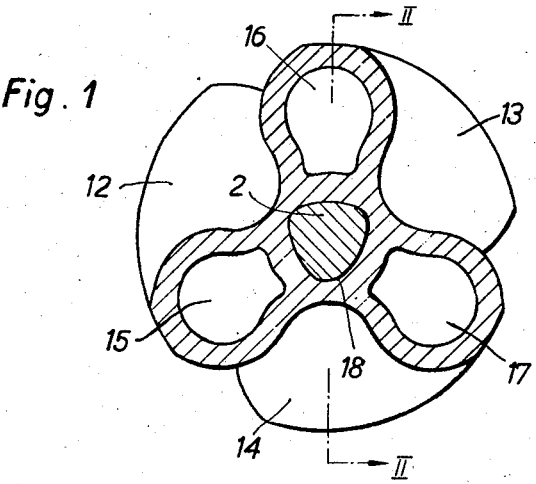
Fig. 1 is a cross-section of a three-bladed rotor with a shaft of polygonal cross-section according to the line I—I in Fig. 2.
Figure 2:
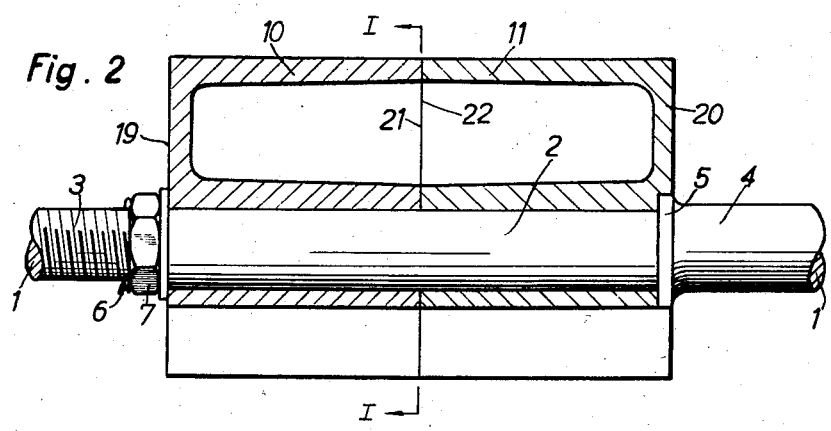
Fig. 2 is a longitudinal section on the line II—II in Fig. 1.

Referring to the drawing and first to Figs. 1 and 2, the rotor shaft 1 has a polygonal section in the middle part 2 thereof and 3 and 4 are the shaft journals. The journal 3 is provided with a screw thread 6 for a nut 7. The two adjoining rotor elements 10 and 11 (Fig. 2) are formed with three teeth each 12, 13 and 14 (Fig. 1) provided with cup-shaped cavities 15, 16 and 17, respectively and with a middle perforation 18 fitting the middle part 2 of the shaft. The two rotor elements 10 and 11 are so mounted on the shaft 2 that their end walls 19 and 20 also form the end walls of the whole rotary compressor rotor. The abutment 5 and the nut 7 secure the two elements 10 and 11 against longitudinal displacement on the shaft 1, the faces 21 and 22 of the elements being forced, by turning the nut 7 against each other with a packing (not shown) arranged between them.

Instead of the abutment 5, the shaft might be provided with screw thread and a nut also on the right hand side to force the two elements against each other and to prevent longitudinal displacement thereof.

Figure 3:
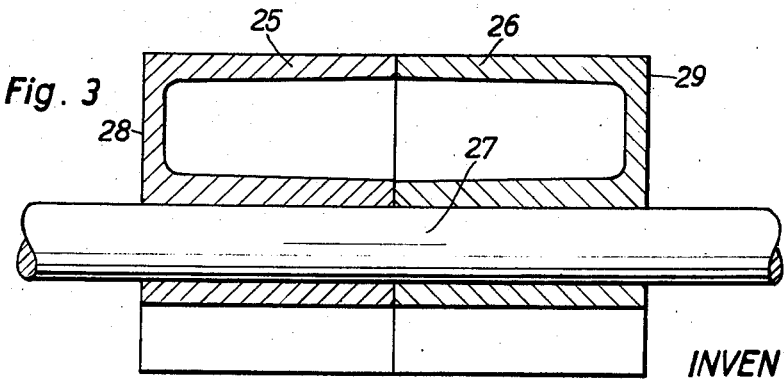
Fig. 3 is the longitudinal section of a rotor with a cylindrical shaft.

In the second embodiment shown in Fig. 3 the two rotor elements 25 and 26 are arranged on the shaft 27 which here is cylindrical in such manner that the two end walls 28 and 29 also form the end walls of the entire rotor. The rotor elements 25 and 26 are connected with each other and with the shaft 27 either by soldering or by welding.

According to the requirements more than two rotor elements may be mounted on one shaft, however, in all cases the end walls of the first and of the last elements should also be the end walls of the entire rotor.

I wish it to be understood that I do not desire to be limited to the details described in the foregoing specification and shown in the drawing for obvious modifications will occur to a person skilled in the art.

I claim:

1. Cast rotor with hollow helical teeth for rotary compressors, comprising in combination, a shaft, at least two rotor elements mounted on said shaft and arranged to bear against one another in a plane perpendicular to the axis of rotation, each element comprising a plurality of teeth, said teeth having cup-shaped cavities open toward one side, and walls closing said cavities on the other side, said elements being so disposed relative to one another that the teeth of the rotor are closed at the outer ends by said cavity closing walls.

2. Cast rotor with hollow helical teeth for rotary compressors, comprising in combination, a shaft, at least two rotor elements mounted on said shaft, arranged to bear against one another in a plane perpendicular to the axis of rotation, and firmly connected with each other, each element comprising a plurality of teeth, said teeth having cup-shaped cavities open toward one side, and walls closing said cavities on the other side, said elements being so disposed relative to one another that the teeth of the rotor are closed at the outer ends by said cavity closing walls, the inner walls of said teeth being substantially parallel with, but tapering slightly in axial direction relative to the outer helical teeth contours.

3. Cast rotor with hollow helical teeth for rotary compressors, comprising in combination, a shaft, at least two rotor elements mounted on said shaft and arranged to bear against one another in a plane perpendicular to the axis of rotation, each element comprising a plurality of teeth, said teeth having cup-shaped cavities open toward one side, and walls closing said cavities on the other side, said elements being so disposed relative to one another that the teeth of the rotor are closed at the outer ends by said cavity closing walls, said cavities extending over a materially larger distance in axial direction than in a direction perpendicular to the axis of rotation.

4. Cast rotor with hollow helical teeth for rotary compressors, comprising in combination, a shaft, at least two rotor elements mounted on said shaft and arranged to bear against one another in a plane perpendicular to the axis of rotation, each element comprising a plurality of teeth, said teeth having cup-shaped cavities open toward one side, and walls closing said cavities on the other side, said elements being so disposed relative to one another that the teeth of the rotor are closed at the outer ends by said cavity closing walls, said cavities extending over a major part of the volume of said teeth, with only comparatively thin walls separating said cavities from said shaft.

References Cited in the file of this patent

UNITED STATES PATENTS

| | | |
|---|---|---|
| 403,101 | Graf | May 14, 1889 |
| 2,325,617 | Lysholm et al. | Aug. 3, 1943 |